(12) United States Patent
Metternich

(10) Patent No.: US 8,684,644 B2
(45) Date of Patent: Apr. 1, 2014

(54) LOCKING DEVICE FOR CONTAINERS

(75) Inventor: Heinz-Ruediger Metternich, Eversen-Heide (DE)

(73) Assignee: RMM Metternich Mechatronik GmbH, Buchholz (DE)

(*) Notice: Subject to any disclaimer, the term of this patent is extended or adjusted under 35 U.S.C. 154(b) by 0 days.

(21) Appl. No.: 13/695,874

(22) PCT Filed: Jun. 22, 2011

(86) PCT No.: PCT/DE2011/075146
§ 371 (c)(1),
(2), (4) Date: Nov. 28, 2012

(87) PCT Pub. No.: WO2012/022326
PCT Pub. Date: Feb. 23, 2012

(65) Prior Publication Data
US 2013/0251473 A1  Sep. 26, 2013

(30) Foreign Application Priority Data
Jun. 25, 2010  (DE) ............... 20 2010 005 717 U

(51) Int. Cl.
*B61D 45/00*  (2006.01)
(52) U.S. Cl.
USPC .......................................... 410/77
(58) Field of Classification Search
USPC ............ 410/69, 70–73, 76–78, 80–84, 90, 91
See application file for complete search history.

(56) References Cited

U.S. PATENT DOCUMENTS

| 4,372,715 A * | 2/1983 | Naffa ............................. 410/79 |
| 4,776,736 A | 10/1988 | Tatina |
| 5,570,981 A * | 11/1996 | Brewster ....................... 410/70 |
| 5,613,814 A | 3/1997 | Jackson |
| 6,074,142 A * | 6/2000 | Schulz ........................... 410/83 |
| 6,547,291 B1 * | 4/2003 | Schwaiger .................... 292/216 |
| 7,114,898 B2 * | 10/2006 | Brewster ....................... 410/70 |
| 7,637,704 B2 * | 12/2009 | Morin ............................ 410/69 |
| 8,458,861 B2 * | 6/2013 | Ostberg ........................ 24/287 |
| 2008/0170924 A1 | 7/2008 | Morin |

FOREIGN PATENT DOCUMENTS

| EP | 0507010 A1 | 10/1992 |
| EP | 1937511 B1 | 7/2008 |
| GB | 1200243 A | 7/1970 |
| WO | 9808720 A1 | 3/1998 |
| WO | 2004045904 A1 | 6/2004 |

* cited by examiner

*Primary Examiner* — H Gutman
(74) *Attorney, Agent, or Firm* — Patent Central LLC; Stephan A. Pendorf

(57) ABSTRACT

A locking device (1) for locking a container (2) onto a loading surface, in particular for road vehicles or railway container wagons, with a first locking lever (11) which is arranged pivotably about an shaft (13) oriented perpendicularly to the loading and unloading direction (Z) and which is preloaded in the direction of a basic position of a spring (14), wherein the shaft of the first locking lever (11) is guided displaceably in the loading and unloading direction (Z), and a toggle lever (117) is provided, the toggle lever being coupled pivotably at one end to the first locking lever (11) and at the opposite end pivotably to a fixing point (102) in the housing (10) such that the shaft (13) of the first locking lever (11), in the loading position of said shaft, is displaced towards the corner fitting (20) and, in the basic position of said shaft, is displaced in the opposite direction.

12 Claims, 6 Drawing Sheets

LOCKING DEVICE FOR CONTAINERS

Figure 1:
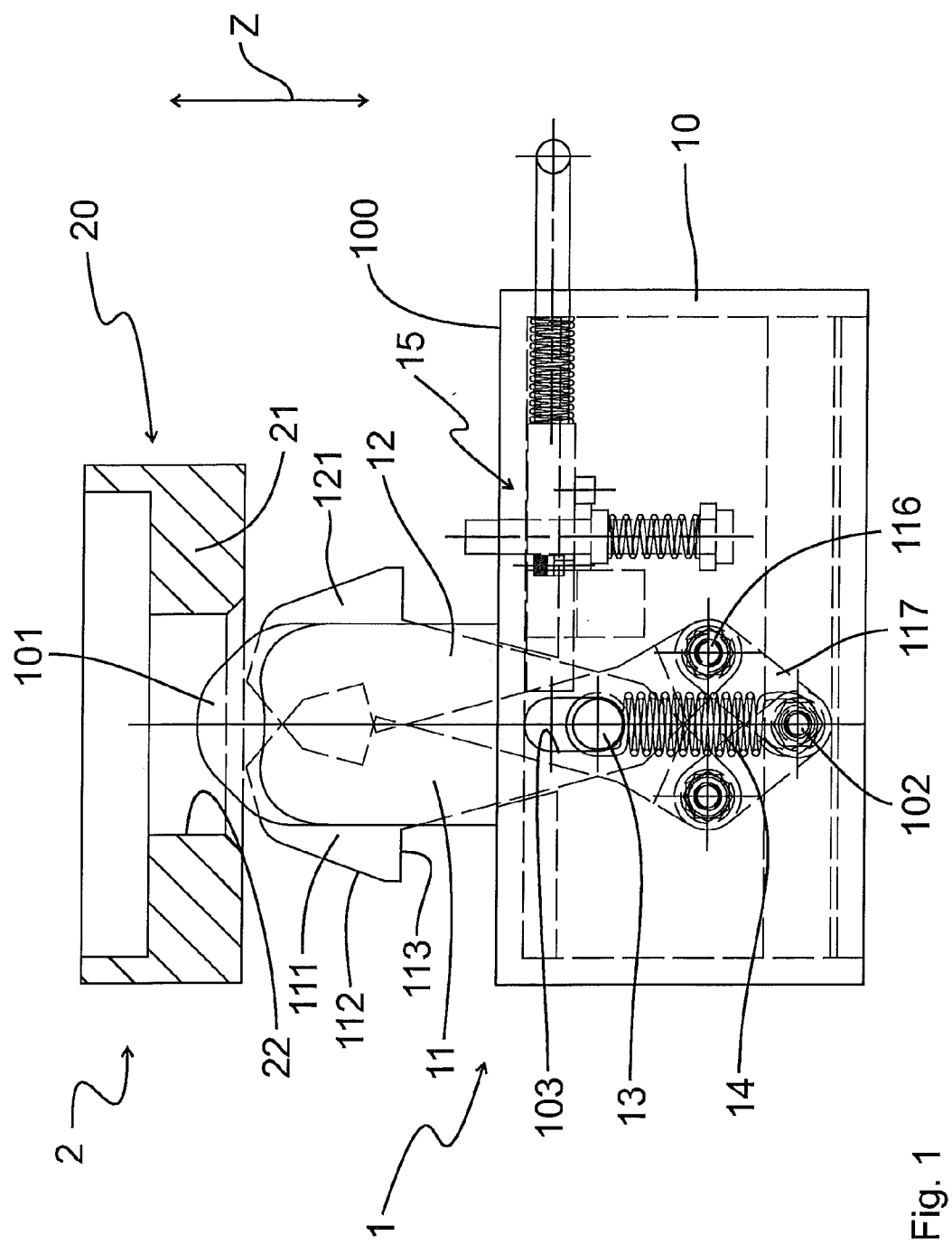

The invention relates to a locking device for locking a container onto a loading surface, in particular for road vehicles or railway container wagons, wherein the container has standardized corner fittings with an opening in one wall, and the loading is carried out in a loading and unloading direction, the looking device having a housing, which has centering means oriented towards the loading surface for guiding the corner fitting, a first locking lever which is pivotally mounted to pivot about an shaft oriented perpendicular to the axis of loading and unloading and which is spring-biased toward a basic position, with a locking head provided at the end of the lever directed towards the container to be locked, which is arranged on the centering means, which has a ramp, via which the first locking lever is pushed back against the spring-force by the wall at the opening of the corner fitting into its loading position during loading of the container, and which after loading engages in the basic position through the opening behind the wall of the corner fitting.

Such a locking device is known from U.S. Pat. No. 5,613,814. In this device, the locking lever is guided between a pivot shaft and a guide pin in such a manner that, when lifting the container, the pawl of the locking lever is pushed back, and thus the corner fitting is released from the locking device. The disadvantage, however, is that significant breakout forces can be required to lift the containers. This particularly affects the handling during unloading.

Furthermore, from EP 1937511 B1 a locking device is known, wherein the two locking levers are arranged in a scissors arrangement, but which are spring biased in the direction of the position for releasing the opening of a corner fitting of a container. The closing force is transmitted to the locking levers by the load of the container during loading when seating upon the locking device. Thereby the weight of the container acts against the spring preload of the locking levers, which thus pivot under increasing load into their locking position, Furthermore, EP 0 507 010 A1 discloses a device for fixing of containers, also having two locking levers, which are formed in a scissors arrangement and pivotable about an axis of rotation, In this device, as in EP 1937511 B1, the scissors arrangement is biased with a spring in the direction of its loading position, so that the device is freely insertable through the opening of the corner fitting of the container and is pivoted into the locking position by the weight of the container against the spring force. By the structure and the design of the locking lever it is achieved with this device that two stacked containers can be connected via this arrangement inserted between the two mutually opposite corner fittings.

Starting from the first-mentioned prior art, it is an object of the invention to provide a locking device, which locks in a simple and reliable manner, and during the unloading process releases the container without much additional encumbrance. Further, it is an object of the invention to provide a self-acting interlock when reaching the locking position.

The aforementioned object is solved with a locking device according to claim 1. Since the shaft of the first locking lever is slidably guided in the loading and unloading direction and since a toggle lever is provided, which is hinged with its free end on the end of the first locking lever which is distal from the corner fitting and is pivotally attached on its opposite end to a fixed point in the housing, such that the shaft of the first locking lever in its loading position is pushed in the direction to the corner fitting, and in its basic position is pushed in the opposite direction, it is achieved that during loading the locking lever of the locking device is pivoted against the force of the spring inwardly and forcibly raised by the toggle lever arrangement. When the opening of the corner fitting has slid by the ramp, the locking lever jumps back to its basic position due to the spring bias, whereupon the locking head of the locking lever, forcibly guided by the toggle lever arrangement and the displaceably guided shaft, is lowered again, so that the locking head is positioned in its locked position, which will be referred to in the following as the basic position, lies against the inside of the wall of the corner fitting, and thus engages the corner fitting.

To prevent accidental lifting of the container, for example in road and rail transport, a locking means is provided. Preferably, the locking means includes a blocking means, which in a blocking position prevents the shaft from sliding out of the basic position and which in a release position permits a displacement of the locking lever from the basic position to the loading position. Alternatively, the locking means may also be designed so that it engages on the toggle joint and prevents a pivoting back.

To prevent undesired releasing of the blocking means, the bolt is loaded spring in the direction of the locking position.

Since the locking means comprises a first loading lock position in which the bolt is locked in the release position, wherein a release means is provided, so that, upon loading, the first loading lock position is released, the locking means can be preset so that a loading operation is possible without requiring simultaneous manual operation of the blocking means. Further, by the trigger means the locking means is activated immediately upon reaching a loaded condon so that, for example, the bolt is seated before the shaft, such that a movement out of the locking position (basic position), and thus a lifting/unloading of the container, is not possible.

Preferably the sensor or trigger means is a probe element close to the position of the corner fitting, which is triggered by the loaded container. The trigger or sensor means projects, for example, from the loading area and is activated in the moment when the container, in particular the outer wall of the corner fitting, is close to the final positioning on the loading area. Preferably a first spring-loaded detent means is provided.

When the blocking means exhibits a second loading blocking position, in which the bolt is locked in the release position for the unloading process, wherein during lifting of the container the trigger means frees the second load lock position and the bolt remains locked in the release position, the releasing of the locking means can take place prior to the unloading process. This example, the bolt is pulled manually against its biasing spring forward out of its blocking position, and is preferably held by means of a second spring-loaded locking means in said second load lock position. To manually release the locking means a handle is preferably provided. Naturally, it is also possible that the release of the blocking position can be remote-controlled and power operated. If then, on lifting the container, the release means releases the second load lock position, then the first spring-loaded detent means is already with its sensing element back in the advanced position, and thus ready for a new loading. In this position, the bolt thus remains in its release position, so that a re-loading can occur at any time.

If the locking head has a shoulder on its side facing the wall within the corner fitting, which in the basic position is substantially orthogonal to the loading and unloading direction and rests on the wall inside of the corner fitting, and during unloading, by pivoting into the loading position, forms a ramp or bevel or ramp, which enables the pivoting of the locking lever into the loading position against the force of the spring, then an unloading with an extremely low release force is ensured.

In a preferred embodiment, a second locking lever is provided, which is disposed with the first locking lever on the shaft in a scissors configuration. By the double-sided locking of the locking device, the reliability is further improved, and ensures a significantly higher breakaway force in the locked state. To ensure matching motion of the two locking levers in the scissors arrangement, each locking lever is associated with a toggle lever. If a spring is used as at least one tension spring between the shaft and the fixed point, a constructively simple design for biasing the locking levers towards their basic position (locking position) is guaranteed.

In the following an exemplary embodiment of the invention will described in detail with reference to the accompanying figures.

Figure 2:
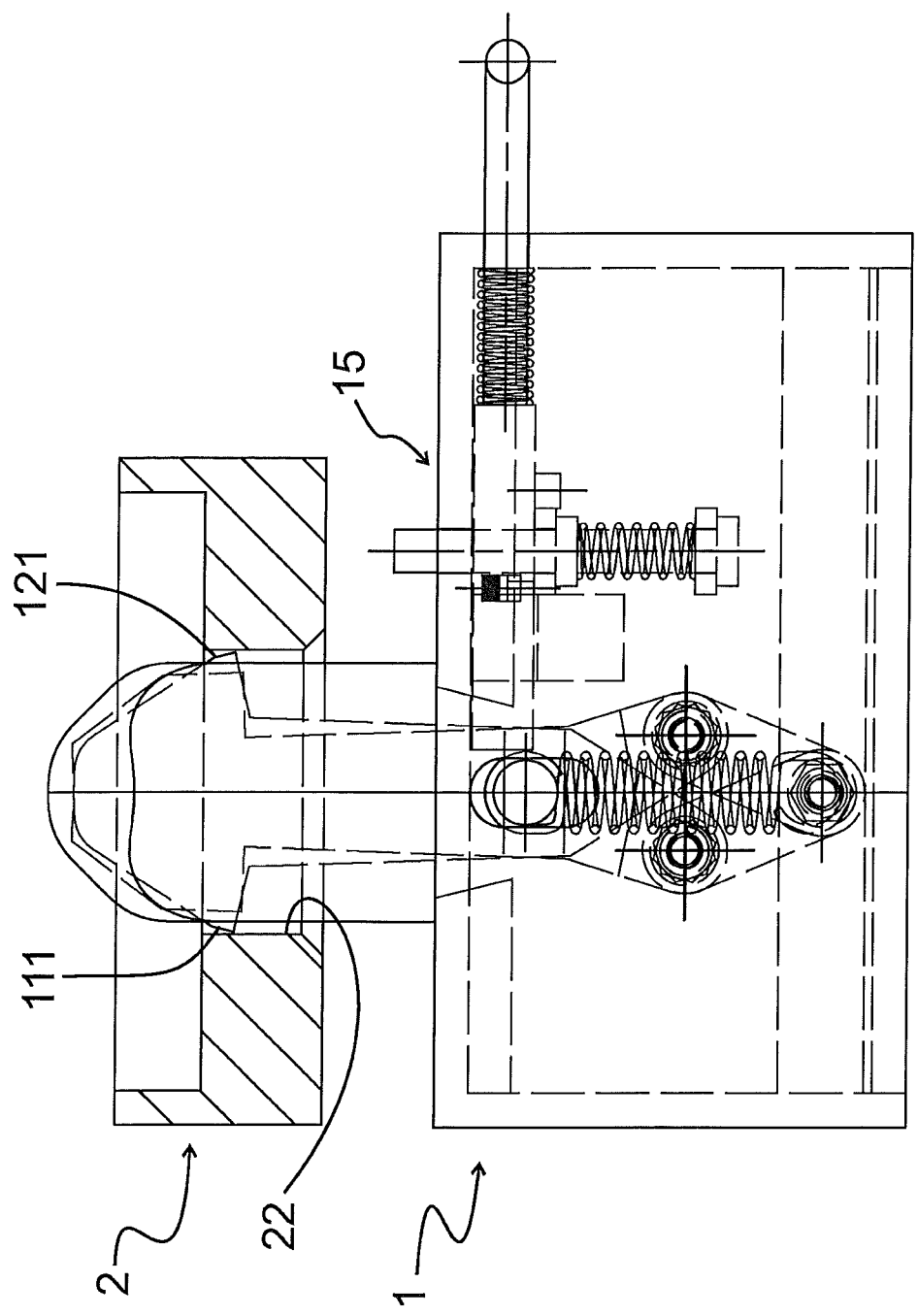
Figure 3:
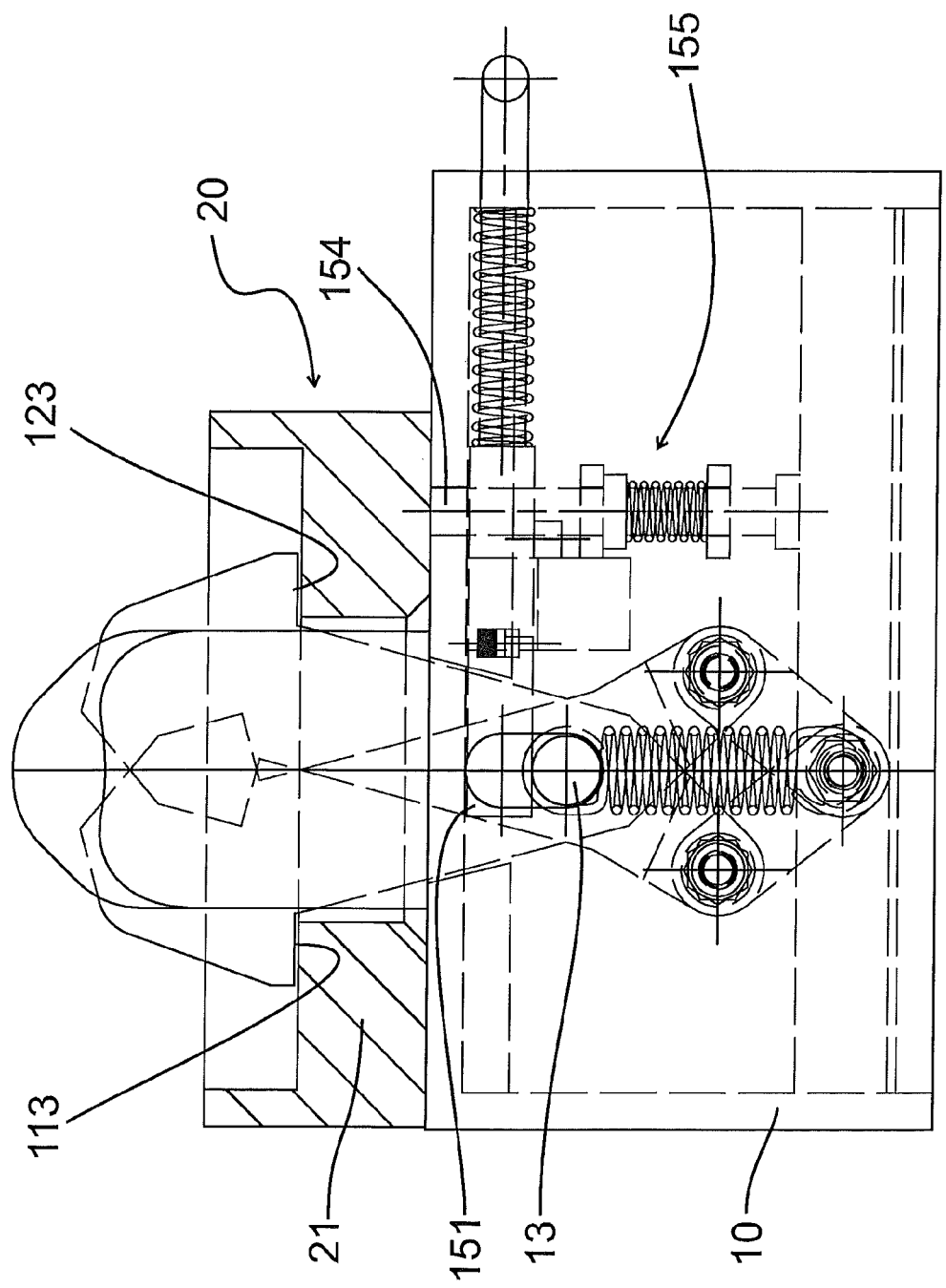
Figure 4:
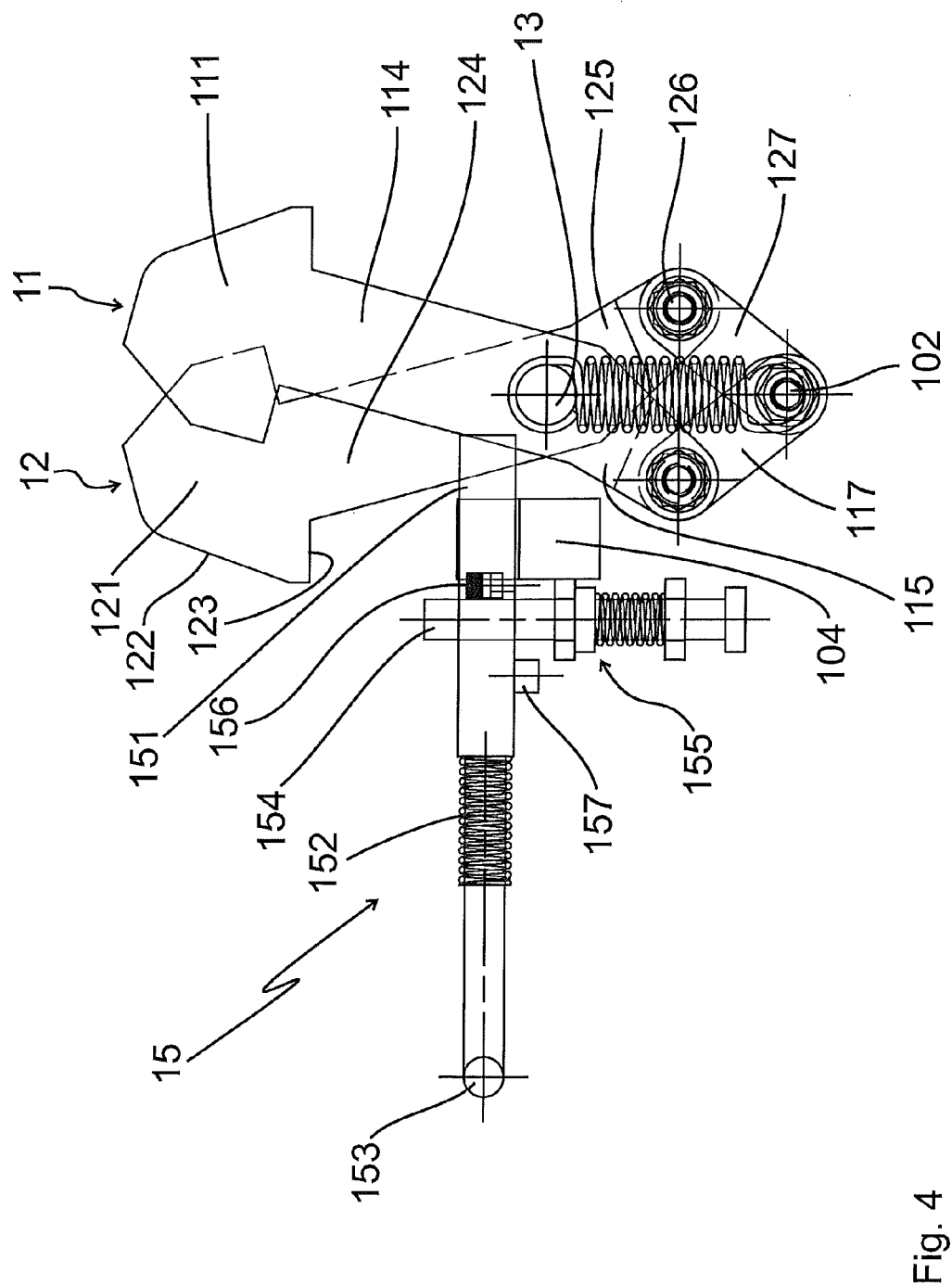
Figure 5:
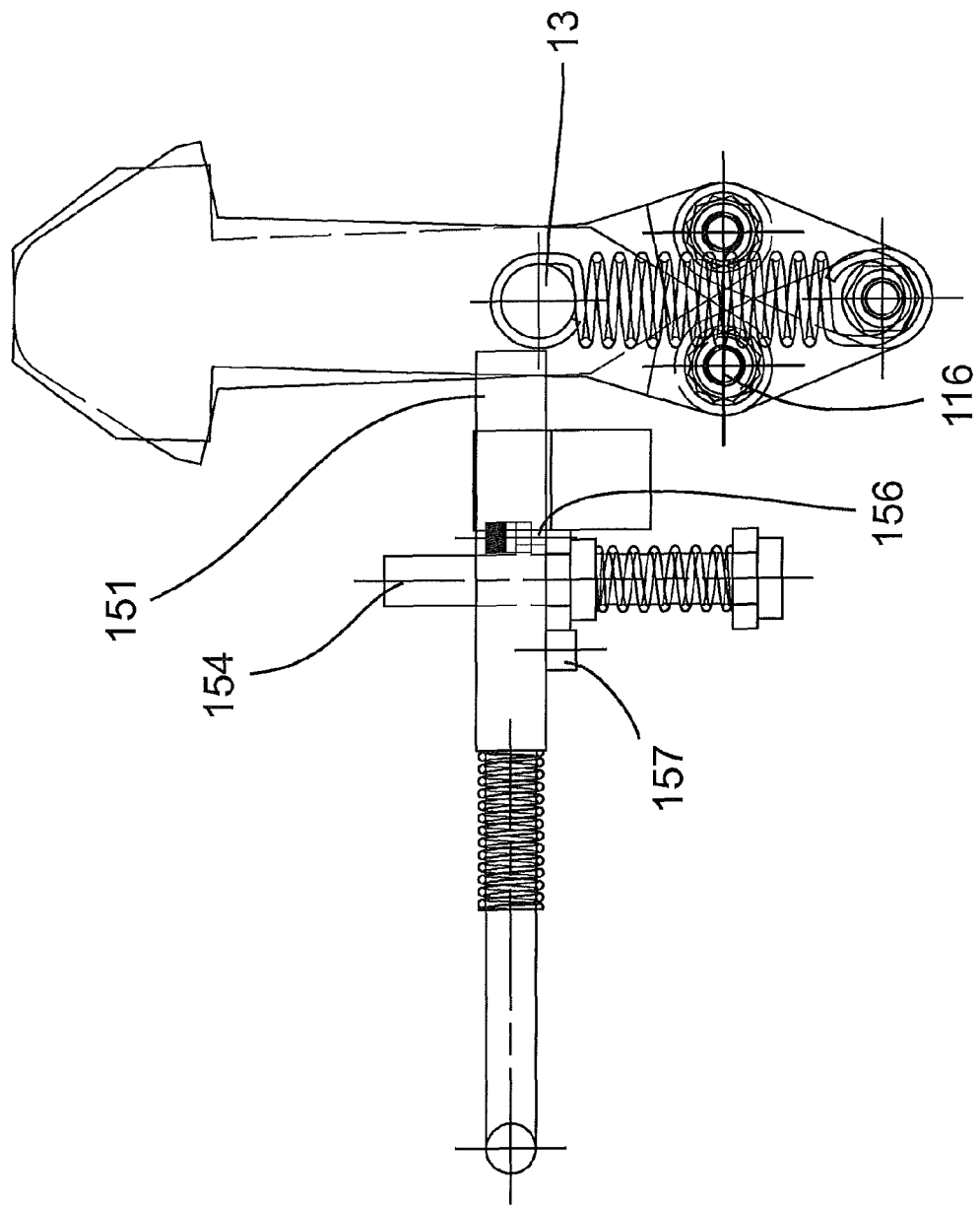
Figure 6:
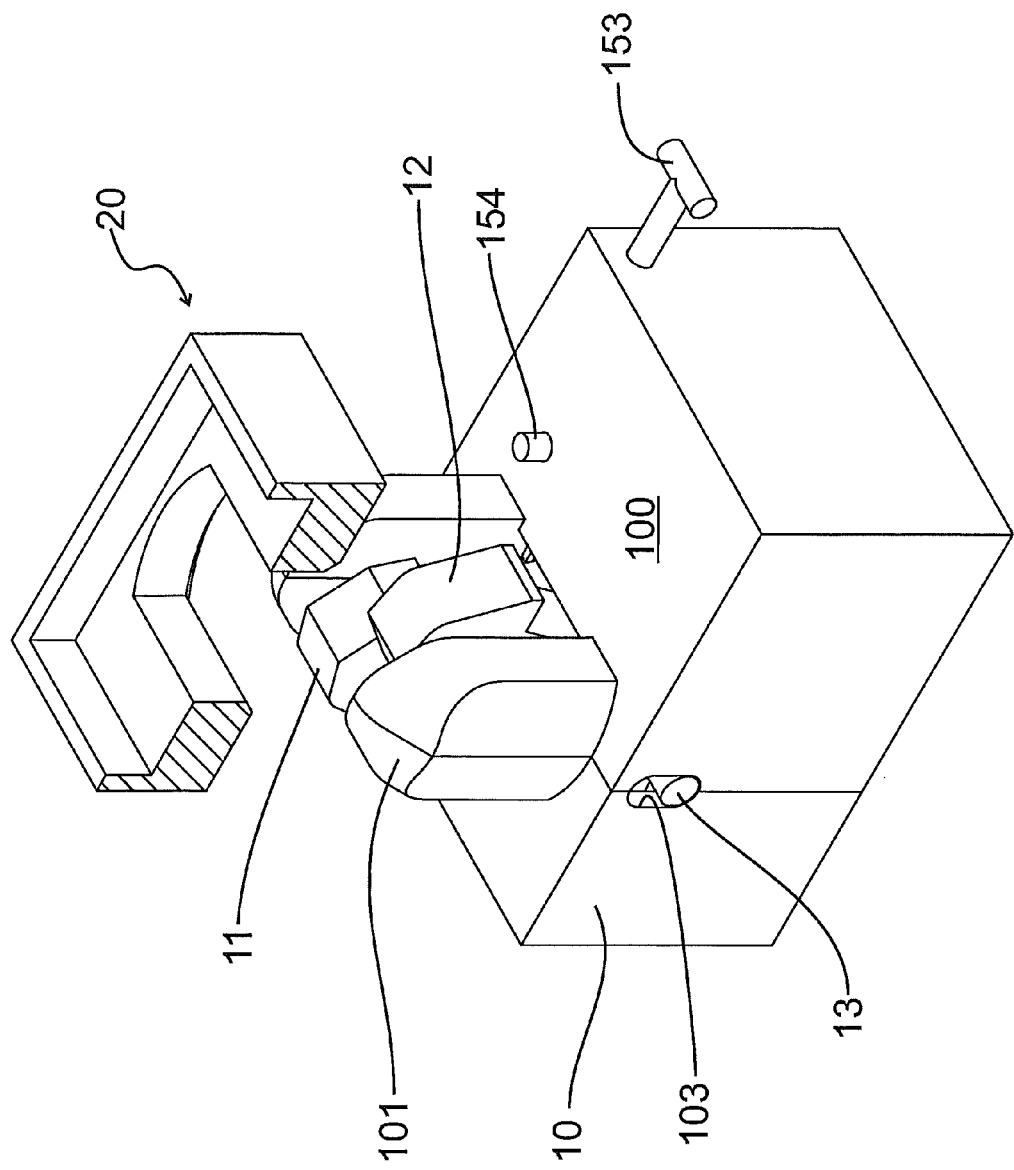

In the drawings:

FIG. 1 shows a partly sectioned side view of the locking device with associated corner fitting prior to the loading operation, FIG. 2 shows the view shown in FIG. 1 during the loading process, FIG. 3 is the view shown in FIG. 1 with a locked and blocked container in a partial sectional view, FIG. 4 is a detail view of the locking lever assembly with associated locking means in the release state ready for unloading, FIG. 5 shows the view of FIG. 4 during the unloading process, and FIG. 6 is a perspective view with partially sectional corner fitting following unloading (condition as in FIG. 1).

In FIG. 1, a locking device 1 is shown in a view with dashed lines representing interior contents. Above the locking device 1 a corner fitting 20 of a container 2 is shown in section. The container 2 is, for example, a standardized cargo container having at least four corner fittings, such as are customary in international cargo transport. For simplicity, only one corner fitting 20 is shown. The corner fitting 20 has a wall 21 in which a standardized opening 22 is formed. In the case of manual locking, so-called "twist locks" are introduced through this opening, rotated about 90 degrees and then braced from below using a cap screw. In this manner this type of secured container is mounted to a loading surface, such as a chassis.

The locking device 1 described in the embodiment allows for an automatic locking during loading, with blocking in the locked position, and a semi-automatic unloading, in which, prior to unloading, a locking means is released.

The locking device 1 comprises a housing 10 which is arranged, for example with a surface 100 at the height of the loading area of the road or rail vehicle. Protruding from this loading plane 100 is a centering means 101 which has in its cross section perpendicular to the loading and unloading direction Z a substantially elliptical cross section, in the illustrative embodiment the centering means 101, as shown in FIG. 6, is formed in two parts, wherein between the two parts of the centering means 101 two locking levers 11, 12 are provided. The first locking lever 11 and the second locking lever 12 are arranged in a scissors arrangement pivotable around a common shaft 13. The first locking lever 11 is a mirror image to the second locking lever 12, and functionally identical, In the following, therefore, the details of the two locking levers are explained in detail only for the first locking lever 11. The details apply equally to the second locking lever 12.

The first locking lever 11 has a locking head 111, which in the view according to FIG. 1 looks like a mushroom. The locking head 111 is formed on an upper lea 114 of the locking lever 11. The locking head 111 has provided on its outwardly directed side a flat ramp 112. The underside of the mushroom-like locking head 111 is formed as a shoulder 113. Below the shaft 13, a lower leg 115 of the first locking lever 11 is formed angled to the upper leg 114. On the lower leg 115 a first toggle lever 117 is pivotably hinged via hinge 116. The first toggle lever 117 is connected pivotably to a stationary fixture 102 mounted in the housing 10 of the locking device 1.

The shaft 13 of the locking lever assembly is slidably guided in the loading and unloading direction Z in elongate slot 103 in the housing 10. A tension spring 14 is provided between the shaft 13 and the fixed point 102.

Furthermore, in the housing 10 of the locking device comprises a blocking or detente means 15 is arranged. The blocking means 15 comprises a slidably guided bolt 151 which is spring biased by means of spring 152 in the direction of its locking position (see FIG. 3). The bolt 151 extends through the housing 10 in the form of a handle 153, to enable movement of the locking means manually from its blocking position into the release position.

Further yet, a release means 154 is provided on the blocking means 15, in the form of a sensing element protruding through the loading surface 100 and depressible by a loaded container (see FIGS. 2 and 3). The sensing element 154 cooperates with a first spring-loaded locking catch or detent means 155. Further, a second spring-loaded locking catch or detent means 156 is provided in association with the blocking means 15. The second spring-loaded detent means 156 is arranged in the bolt 151.

In the following a complete loading and unloading cycle will be described on the basis of FIGS. 1 to 6. In FIG. 1, the container 2 is located above the locking device 1, As the container 2 approaches the loading area 100, the opening 22 of the corner fitting 20 of the container 2 is received and centered via the centering means 101 of the locking device 1. Upon further lowering of the container 2 the ramps or bevels 112 and 122 of the lock lever 11, 12 come into contact with the wall 21 at the underside of the opening 22 of the corner fitting 20 urging the locking levers 11, 12 into a position pivoted relative to one another in accordance with FIG. 2 (loading position). By the arrangement of each with a toggle lever 117, 127 and the fixing of this arrangement at the fixed point 102 of the housing 10 the shaft 13 is displaced upwards in the elongated hole 103 (see FIG. 1 and FIG. 2).

Upon further lowering of the container, the outer wall 22 of the corner fitting 20 comes into contact with the sensing element 154 of the locking means 15. Now the shoulders 113, 123 of the locking levers 11, 12 slide, along the inner edge of the opening 22, behind the inside of the wall 21 of the corner fitting 20. Simultaneously, by depression of the sensing element 154, the first spring-loaded detent means 155 is opened against the spring force, so that the bolt 151 by the tensioned compression spring 152 is sprung to the left position shown in FIG. 3 between shaft 13 and housing 10. The container is thus locked after seating on the cargo surface 100 by the rear engagement of the locking lever 11, 12 in the corner fitting 20. By the advanced bolt 151 of the blocking means 15, the locking device is locked also in this position. Now the container can safely be transported in road and rail traffic. An accidental falling of the container from the carrying vehicle (chassis bed or railway wagons) is avoided, When the container is to be unloaded after transport, an operator releases the blocking means 15 by puffing the handle 153. Here, the bolt 151 engages with its second spring-loaded detent means 156 on a projection (104) provided in the housing 10 (FIG. 4). In this situation, the container is still on the platform 100, the locking levers 11, 12 lie in their spring-loaded basic position, that is, engage behind the wall 21 while remaining in the corner fitting 20 of the container 2. If then the container is lifted from the bed 100, then the lock lever 11. 12, and the shoulders 113, 123 formed on the underside of the locking head 111, 121, during the lifting of the container, are pushed back against the pressure of the tension spring 14 into the position shown in FIG. 5, whereupon simultaneously, on lifting the container from the loading area 100, the sensing element 154 by the spring of the first spring-loaded detent means 155 moves upwardly while the second spring-loaded detent means 156 presses in the bolt 151 thereby releasing the bolt 151. However, since at this time the first spring-loaded detent means 155 lies in its baring position, that is, the bolt 151 via projection 157 is applied against the first spring-loaded detent means 155, the blocking means 15 remains in the release position shown in FIG. 5.

After complete removal of the container 2 the two locking levers 11, 12, spring-loaded by tension spring 14, slide in the position shown spatially in FIG. 1 and FIG. 6. The locking device 1 is thus prepared for a new loading process.

REFERENCE LIST 1 locking Device
10 housing
100 cargo area, surface
101 centering means
102 fixed point
103 slot
104 projection
11 (first) lock lever
111 locking head
112 ramp
113 shoulder
114 upper leg
115 lower leg
116 joint
117 (first) toggle
12 second locking lever
121 locking head
122 ramp
123 shoulder
124 upper leg
125 lower leg
126 joint
127 second toggle
13 shaft
14 spring
15 blocking means
151 bolt
152 spring
153 handle
154 trip means sensing element
155 first spring-loaded detent means
156 second spring-loaded detent means
157 projection
2 container
20 corner fitting
21 wall
22 opening
Z loading and unloading direction

The invention claimed is:

1. A locking device (1) for locking a container (2) onto a loading surface, in particular for road vehicles or railway container wagons, wherein the container (2) has standardized corner fittings (20) with an opening (22) in a wall (21) and wherein loading is carried out in a loading and unloading direction (Z), the locking device comprising:

a housing (10) having centering means (101) directed to the loading surface for guiding the corner fitting (20),
a first locking lever (11) arranged pivotally about an shaft (13) oriented perpendicular to the loading and unloading direction shaft (Z), and which is biased in the direction of a base position by a spring (14),
a locking head (111) provided at that end of the locking lever which is directed towards the container (2) to be locked,
  which is arranged on the centering means (101),
  which has a ramp (112), with which the first locking lever (11) is pushed back against the force of the spring (14) by the wall (21) at the opening (22) of the corner fitting (20) during loading of the container (2) into its loading position, and
  which engages in the basic position after loading through the opening (22) behind the wall (21) of the corner fitting (20),
wherein the shaft of the first locking lever (11) is slidably displaceable in the loading and unloading direction (Z) and
wherein a toggle lever (117) is provided, said toggle lever being coupled pivotably at the free end thereof to that end of the first locking lever (11) which is remote from the corner fitting (20), and the opposite end of said toggle lever is fastened pivotably to a fixing point (102) in the housing (10),
such that the shaft (13) of the first locking lever (11), in the loading position of said shaft, is displaced towards the corner fitting (20) and, in the basic position of said shaft, is displaced in the opposite direction.

2. A locking device (1) according to claim 1, wherein a blocking means (15) is provided which prevents unintentional lifting of the container (2).

3. A locking device (1) according to claim 2, wherein the blocking means (15) comprises a lock bolt (151), which in a blocking position prevents a displacement of the shaft (13) away from the initial position, and in a release position, allows a displacement of the locking lever (11) from the initial position to the loading position.

4. A locking device (1) according to claim 3, wherein the lock bolt (151) is spring loaded with a spring (152) in the direction of the blocking position.

5. A locking device (1) according to claim 3, wherein the blocking means (15) has a first biased baring or detent position, in which the lock bolt (151) is locked in the release position, wherein a release means (154) is provided, so that during loading the first biased baring position is released.

6. A locking device (1) according to claim 5, wherein the release means (154) is a probe element close to the position of the corner fitting (20), which is triggered by the seated container (2).

7. A locking device (1) according to claim 5, wherein the blocking means (15) has a second biased baring or detent position in which the lock bolt (151) is arrested in the release position for an unloading operation, wherein upon lifting of the container (2) the release means (154) releases the second loaded detent position and the locking bolt (151) remains locked in the release position in the first loaded detent position.

8. A locking device (1) according to claim 5, wherein for the first loaded detent position a first spring-loaded locking catch means (155) is provided, and for the second loaded detent position a second spring-loaded locking catch means (156) is provided.

9. A locking basking device (1) according to claim 8, wherein each locking lever (11) is associated with a toggle lever (117).

10. A locking device (1) according to claim 1, wherein the locking head (111) has a shoulder (113) facing the wall (21) inside the corner fitting (20) which in the basic position rests against the wall (21) within the corner fitting (20) substantially orthogonal to the loading and unloading direction (Z) and during unloading, by pivoting into the loading position, exhibits a ramp, which makes possible the pivoting of the locking lever (11) in the loading position against the force of the spring (14).

11. A locking device (1) according to claim 1, wherein a second locking lever (12) is provided on the shaft (13) which together with the first locking lever (11) forms a scissors arrangement.

12. A locking device (1) according to claim 1, wherein between the shaft (13) and the fixed point (102) the spring (14) is inserted as at least one pull-spring.

* * * * *